United States Patent
Maierean

(10) Patent No.: US 10,033,674 B1
(45) Date of Patent: Jul. 24, 2018

(54) COMMUNICATION MANAGEMENT SYSTEM

(71) Applicant: CALLFIRE, INC., Santa Monica, CA (US)

(72) Inventor: Radu Maierean, Los Angeles, CA (US)

(73) Assignee: CALLFIRE, INC., Santa Monica, CA (US)

( * ) Notice: Subject to any disclaimer, the term of this patent is extended or adjusted under 35 U.S.C. 154(b) by 0 days.

(21) Appl. No.: 15/902,524

(22) Filed: Feb. 22, 2018

Related U.S. Application Data

(60) Provisional application No. 62/535,681, filed on Jul. 21, 2017.

(51) Int. Cl.
*H04W 4/14* (2009.01)
*H04L 12/58* (2006.01)
*H04M 7/00* (2006.01)

(52) U.S. Cl.
CPC ............ *H04L 51/066* (2013.01); *H04L 51/04* (2013.01); *H04L 51/16* (2013.01); *H04L 51/28* (2013.01); *H04M 7/0048* (2013.01); *H04W 4/14* (2013.01)

(58) Field of Classification Search
CPC ........ H04W 4/02; H04W 4/021; H04W 4/025; H04W 4/027; H04W 4/22; H04W 4/90; H04W 4/14
See application file for complete search history.

(56) References Cited

U.S. PATENT DOCUMENTS

| | | | |
|---|---|---|---|
| 2014/0129639 A1* | 5/2014 | Burge | H04L 51/32 709/204 |
| 2017/0302615 A1* | 10/2017 | Burge | H04L 51/32 |

* cited by examiner

*Primary Examiner* — Diane Mizrahi
(74) *Attorney, Agent, or Firm* — Knobbe, Martens, Olson & Bear, LLP

(57) ABSTRACT

A communication management system manages the exchange of messages between devices using different communication networks and/or protocols. A sender device may transmit a message (e.g., a short message service "SMS" message) to a destination associated with a traditional "landline" phone number. The message may be delivered over a traditional landline phone network. The communication management system can receive the message via the phone network, process the message, and provide the message to one or more electronic devices over a packet switched network, such as a local area network or the Internet. The electronic devices may use chat-based application software to process and display the message, provide robust message handline functionality, and facilitate responses to the message.

20 Claims, 5 Drawing Sheets

COMMUNICATION MANAGEMENT SYSTEM

CROSS-REFERENCE TO RELATED APPLICATION

The present application claims priority to U.S. Provisional Patent Application No. 62/535,681, filed on Jul. 21, 2017, which is incorporated by reference herein.

BACKGROUND

Electronic devices may be used to exchange information over communication networks. For example, a mobile phone may be used to generate a text message (also referred to as a short message service message or "SMS" message). The mobile phone may send the text message to another mobile phone over the public switched telephone network ("PSTN"). A user of the other mobile phone can view the text message and respond with a text message reply, if desired. Some mobile phones are configured to send and/or receive images, video, and other media information in addition to text messages. For example, some mobile phones may generate and transmit multimedia messaging service ("MMS") messages to other mobile devices.

Some mobile devices may be capable of executing application software and accessing a packet switched data network, such as a local area network ("LAN") or the Internet. Such mobile devices may be referred to as "smart devices," and include smart phones, tablets, and the like. Smart devices may use instant messaging, chat, or other application software to generate messages and send them to other devices over data networks. The recipients may be other smart devices, traditional computing devices (e.g., desktop or notebook computers), or other electronic devices. The application software that manages the messaging may provide more messaging functionally than SMS or MMS messages. For example, application software may manage group "chats" in which messages can be shared among groups of users who are using different devices. In such chats, messages can be responded to on a group-wide basis or on a private basis.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Introduction

Figure 1:
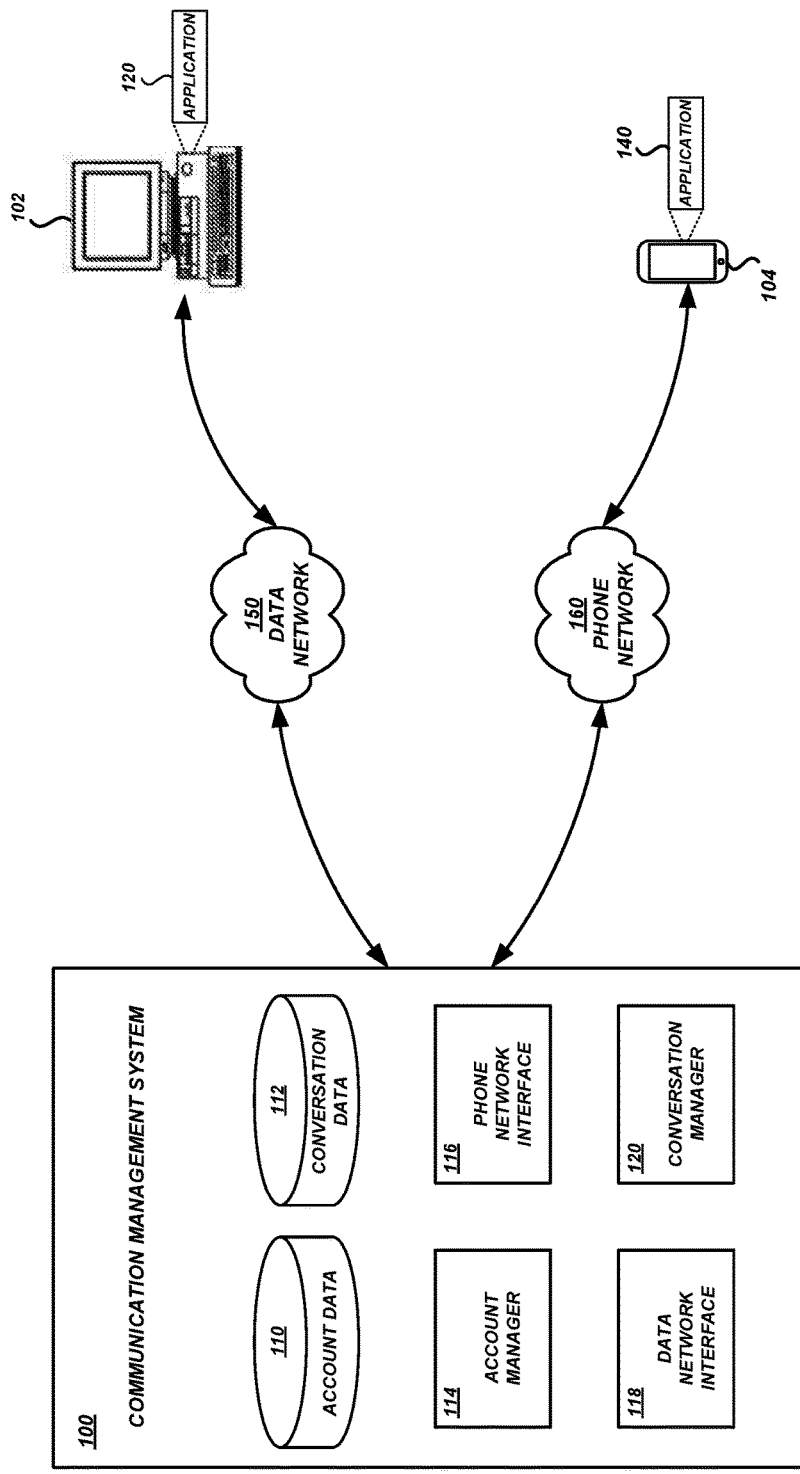
FIG. 1 is a block diagram of an illustrative computing environment including a communication management system, various end user devices, and various networks according to some embodiments.

The present disclosure is directed to a communication management system that manages the exchange of messages between devices using different communication networks and/or protocols. Messages may be exchanged between different end user devices during a conversation. One device may send/receive phone-based messages (e.g., short message service or "SMS" messages"), another device may send/receive chat-based messages (e.g., messages or posts that are part of a "chat room"), and so on. For example, one end user device participating in the conversation may be a mobile device such as a mobile phone, and another end user device may be a desktop computer or notebook computer. The communication management system can automatically manage the conversation between these different devices, processing messages that have been transmitted using different protocols to ensure that each device is able to participate in the conversation. In some embodiments, the communication management system can automatically manage such conversations seamlessly, without requiring any additional application software to be installed on any of the user devices participating in the conversation, and without requiring any additional software to be installed on any chat-system-specific servers.

Conventional messaging systems typically use one type of network and/or messaging protocol from end-to-end. For example, a mobile phone may transmit a text message (e.g., an SMS message) to another mobile phone using the public switched telephone network ("PSTN"). The sending phone may send the message using the telephone number of the receiving phone as the destination address, and the PSTN handles routing and delivery of the message. Even if a device is capable of communicating using more full-featured collaboration systems, the device may treat a conversation with another device that only uses SMS messages, such as a phone, as a series of SMS messages rather than using the features of the collaboration system. Some telephone numbers assigned to traditional telephone accounts (e.g., landlines) may also be used to send text messages. However, unlike mobile devices, some conventional phones that use the traditional telephone accounts are not capable of sending, receiving, displaying, or otherwise processing text messages. In addition, some telecommunications equipment or central offices in the PSTN may not be equipped to handle such messages sent to/from phone numbers associated with traditional telephone accounts. Thus, even if the capability to send/receive text messages exists for a given traditional telephone account, the ability to do so in practice may be limited by the existing equipment.

Some aspects of the present disclosure address, among other things, shortcomings with conventional messaging, such as those described above. In some embodiments, a sender device, such as a mobile phone, may transmit a phone-based message (e.g., SMS message). The mobile phone may transmit the message to a destination associated with a traditional (e.g., landline) phone number, and the message may therefore be delivered over a phone network (e.g., PSTN). However, the phone number may be assigned to or associated with a communication management system, rather than an end user device. Thus, rather than the message being transmitted to another phone or end user device, the message may be transmitted to the communication management system, and the communication management system may act as an intermediary in a conversation between end user devices. The communication management system can receive the phone-based message via the phone network, process the message, and provide the message to one or more electronic devices over a packet switched network, such as a local area network ("LAN") or the Internet. In some embodiments, the electronic devices may use chat-based application software to process and display conversation messages, provide robust message handling functionality (e.g., features not typically available for SMS messages), and facilitate conversation responses. The communication management system can automatically process the phone-based message and generate a conversation message that is able to be viewed and acted upon as a native conversation message using the chat-based application software. The communication management system can also handle the receipt, processing, and transmission of responses to the conversation message back to the original phone via the phone network.

Although aspects of some embodiments described in the disclosure will focus, for the purpose of illustration, on particular examples of end user devices, networks, and messaging protocols, the examples are illustrative only and are not intended to be limiting. In some embodiments, the techniques described herein may be applied to additional or alternative end user devices, networks, and messaging protocols. Various aspects of the disclosure will now be described with regard to certain examples and embodiments, which are intended to illustrate but not limit the disclosure.

Network-Based Messaging Environment

With reference to an illustrative embodiment, FIG. 1 shows a network environment in which aspects of the present disclosure may be implemented. As shown, the network environment may include a communication management system 100 and various communication devices 102, 104. The communication devices 102, 104 may also be collectively referred to as end-user devices, or more simply as user devices. The communication management system 100 and the various user devices 102, 104 may communicate with each other via one or more communication networks 150, 160.

In some embodiments, communication network 150 may be a packet-switched data network. Illustratively, communication network 150 may be a publicly-accessible network of linked networks, possibly operated by various distinct parties, such as the Internet. In some cases, the network 150 may include a private network, personal area network, local area network, wide area network, cable network, satellite network, cellular data network, etc., or a combination thereof, some or all of which may or may not have access to and/or from the Internet.

In some embodiments, communication network 160 may be a circuit-switched network or other telephone network. For example, communication network 160 may be a publicly-accessible telephone network, such as the PSTN. In some cases, the communication network 160 may be or include a private telephone network, such as a private branch exchange ("PBX").

Communication network 150 may be referred to as a "data network" to highlight its use as a network for transmitting bit-encoded data, and communication network 160 may be referred to as a "phone network" to highlight its use as a network for transmitting telephone communications such as telephone call audio, text messages, and the like. In some embodiments, however, communication network 150 may also be used to transmit telephone call audio, and/or it may include an analog network. Likewise, in some embodiments, communication network 160 may also be used to transmit bit-encoded data, and/or it may include a packet-switched data network.

The communication management system 100 may include various components for providing the features described herein. Illustratively, the communication management system 100 may include an account data store 110 for storing data regarding accounts with the communication management system 100 (e.g., which phone numbers are assigned to which customer/chat room/etc.), and a conversation data store 112 for storing data regarding ongoing or past conversations (e.g., which external phone numbers are currently involved in which conversation/private chat/etc.). The communication management system 100 may also include an account manager 114 that handles the setup, configuration, and ongoing management of accounts with the communication management system 100. The communication management system 100 may also include a phone network interface 116 that manages transmission and receipt of messages (e.g., SMS messages) over a phone network, such as the phone network 160. The communication management system 100 may also include a data network interface 118 that manages transmission and receipt of messages over a data network, such as the data network 150. The communication management system 100 may also include a conversation manager 120 that handles the conversion between different message types, and which manages the messages and participants in a conversation. The example components and data stores of the communication management system 100 shown in FIG. 1 are illustrative only, and are not intended to be limiting. In some embodiments, a communication management system 100 may have fewer, additional, and/or alternative components and data stores.

The communication management system 100 may be implemented on one or more physical server computing devices that provide computing services and resources to user devices 102, 104. In some embodiments, the communication management system 100 (or individual components thereof, such as the account manager 114, phone network interface 116, data network interface 118, conversation manager 120, etc.) may be implemented on one or more host devices, such as blade servers, midrange computing devices, mainframe computers, desktop computers, or any other computing device configured to provide computing services and resources. For example, a single host device may execute one or more account managers 114, phone network interfaces 116, data network interfaces 118, conversation managers 120, some combination thereof, etc. The communication management system 100 may include any number of such hosts.

In some embodiments, the features and services provided by the communication management system 100 may be implemented as web services consumable via one or more communication networks. In further embodiments, the communication management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual user devices 102, 104 may be any of a wide variety of electronic communication devices, including personal computing devices, terminal computing devices, laptop computing devices, tablet computing devices, electronic reader devices, wearable computing devices, mobile devices (e.g., cellular and other mobile phones, smart phones, media players, handheld gaming devices, etc.), and various other electronic devices and appliances.

In some embodiments, the user devices 102 are devices configured to send/receive messages as part of a conversation or other collection of messages, such as a "chat room," that leverages features beyond those typically associated with simple phone-based messages such as SMS messages. For example, a user device 102 may be configured with application software 120 that provides robust conversation and collaboration features (e.g., a browser application or a client application for a collaboration system such as Slack, Trello, etc.). Messages handled by such systems may be referred to as "conversation messages."

In some embodiments, the user devices 104 are devices configured to send/receive text or media messages over a phone network. Such messages may be referred to as "phone-based messages." For example, a user device 104 may be configured with application software 140 that provides SMS message functionality to send text messages to other devices that also provide SMS message functionality.

Although the user devices 102 and user devices 104 are referred to separately herein, in some embodiments the user devices 102 and 104 may be the same type of device or may provide some or all of the same functionality as each other. In the context of a given conversation, the user device 102 may be the device that is using application software 120 that provides conversation message functionality and/or communicates over data network 150, while the user device 104 may be the device that is using application software 140 that provides phone-based message functionality and/or communications over phone network 160.

Example Communication Management System Setup Process

Figure 2:
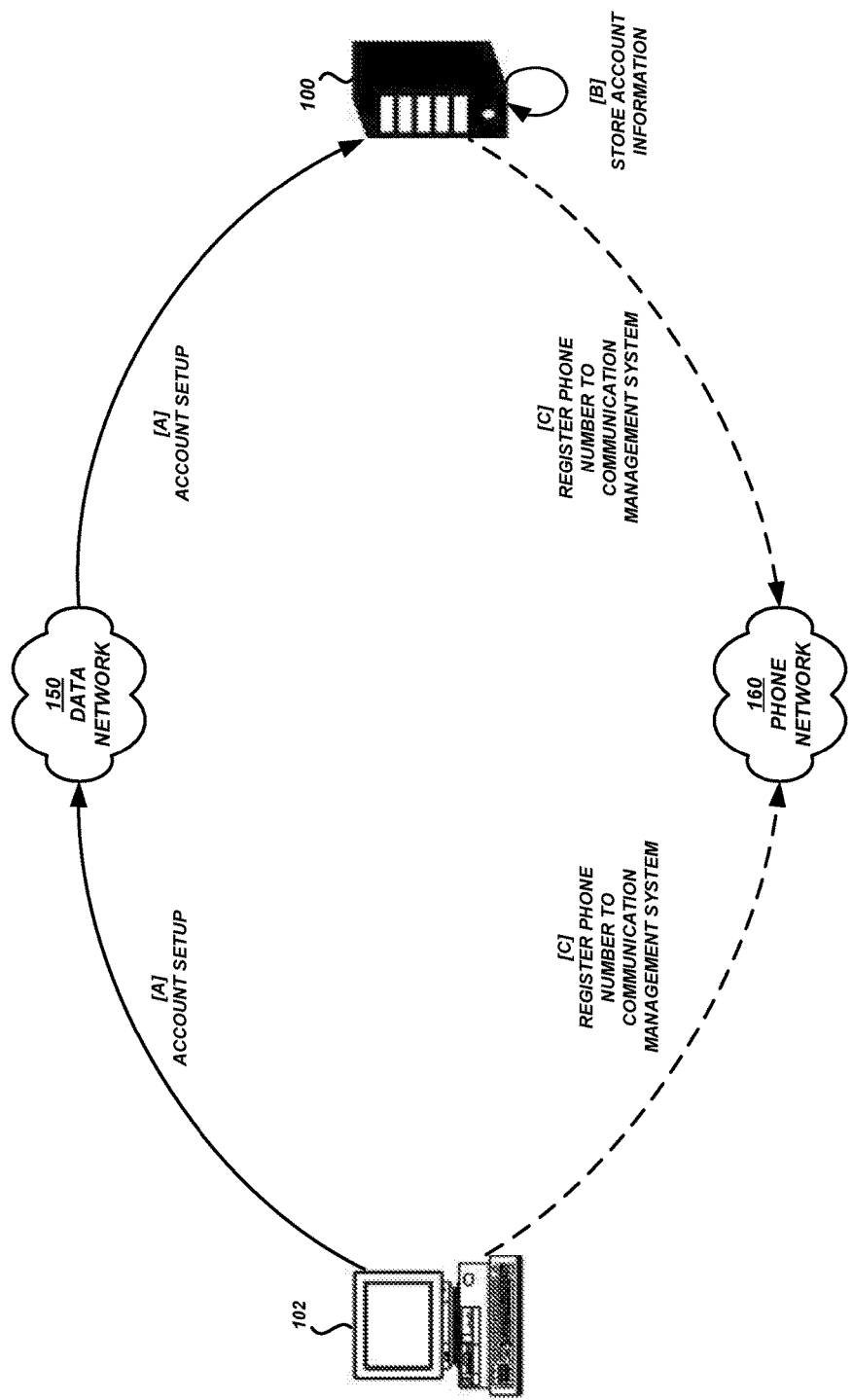
FIG. 2 is a block diagram of various data flows and interactions between the communication management system, an end user device, and various networks during a configuration operation, according to some embodiments.

FIG. 2 shows example data flows and interactions between the communication management system 100, a user device 102, and networks 150 and 160 during the setup of the communication management system 100 as an intermediary for conversations. An entity, such as a company or individual person, may have or acquire a telephone account and associated telephone number. Messages (e.g., SMS messages) may be sent to devices associated with the telephone account by addressing them to the associated telephone number. However, the entity that has the telephone account may wish to leverage collaboration software that provides conversation messaging features not typically available to the telephone account. In order to use the features provided by the collaboration software with the telephone account, the entity may use the communication management system 100 as an intermediary. Advantageously, by using the communication management system 100 as an intermediary, the entity may use the features provided by the collaboration software, and the communication management system 100 can handle conversion of conversation messages to/from a format supported by the telephone account (e.g., the communication management system 100 may send/receive phone-based messages over the phone network 150 on behalf of the entity, while also allowing the entity to use other features outside of the phone network 150 in the same conversation).

At [A], a user device 102 can set up an account with the communication management system 100 over the data network 150. Illustratively, a user may launch a browser application or other application software, and register an account with the communication management system 100. In some embodiments, this step may not be performed by a user device 102 or over a data network 150. Instead, the communication management system 100 may offer its services and, optionally, available telephone numbers. A representative of the entity may then contact the communication management system 100 to employ its services (e.g., via a phone call, interaction with a sales representative, etc.).

At [B], the communication management system 100 can store information about the account in the account data store 110. For example, the telephone number that the communication management system 100 is to use to send/receive messages over the phone network 160 on behalf of the entity may be stored in the account data store 110. The communication management system 100 may store other information pertinent to the management of the account, such as collaboration account information that the communication management system 100 is to use to send/receive messages to the user device 102 or other associated user devices 102 over the data network 150. Collaboration account information may include login information for joining conversations in chat systems (e.g., chat rooms), an identification of individual chat rooms into which messages are to be placed, individual user devices 102 to which messages are to be forwarded, etc.

At [C], the communication management system 100 can be registered as the end point associated with the telephone number for the entity's account. Illustratively, the communication management system 100 may handle registration or transfer of the phone number with the phone network 160, or the user device 102 (or some other device or person associated with the entity) may handle registration or transfer of the phone number with the phone network 160. After [C], messages addressed to the phone number will be routed by the phone network 160 to the communication management system 100, rather than to the user device 102 or some other device associated with the entity. As described in greater detail below, the communication management system 100 can then act as an intermediary between the sender of the message, and the user device 102 or other devices associated with the entity.

Example Conversation Management Process

Figure 3:
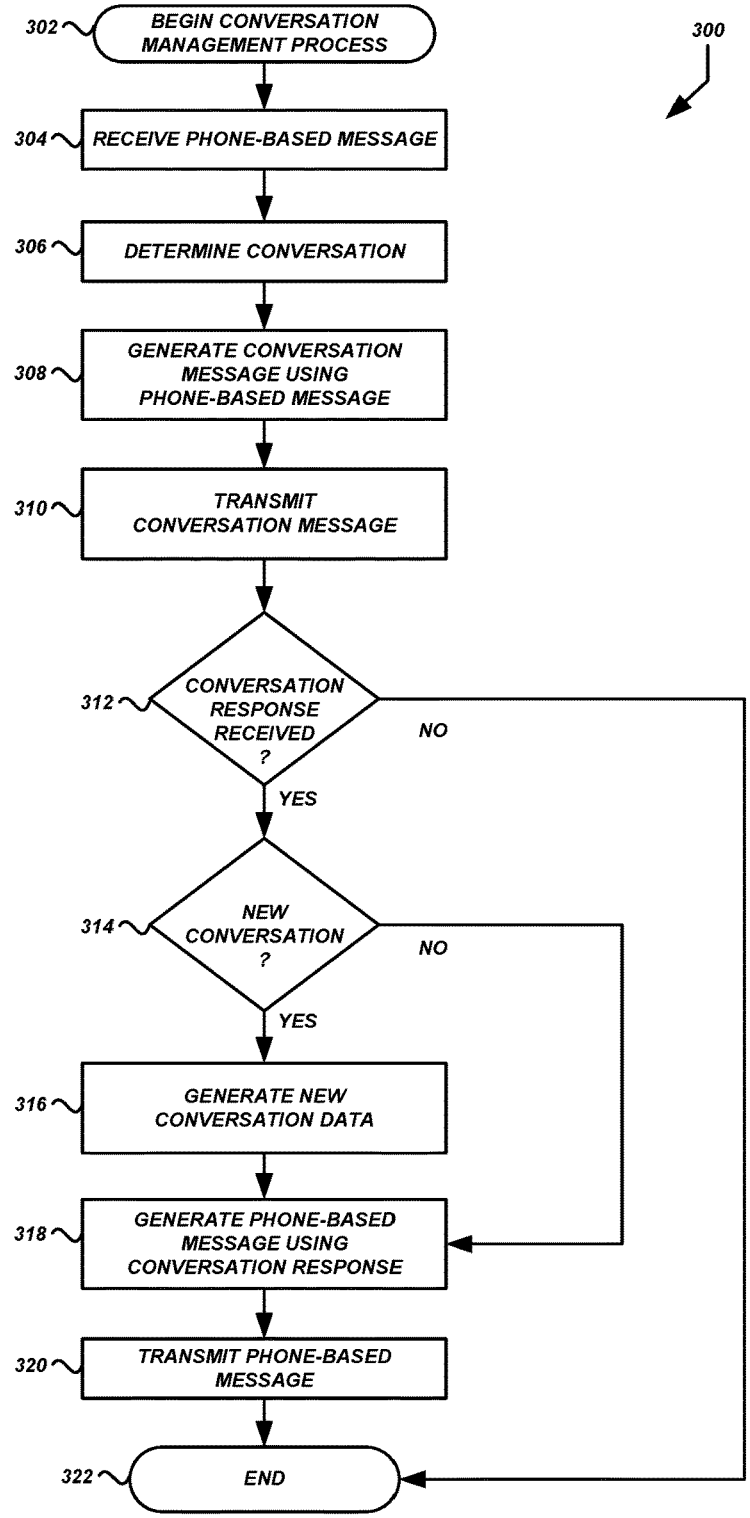
FIG. 3 is a flow diagram of an illustrative process for managing exchange of messages according to some embodiments.

FIG. 3 is a flow diagram of an illustrative process 300 that may be executed by a communication management system 100 to manage a conversation that includes both phone-based messages and conversation messages. Advantageously, the process 300 can automatically transform phone-based messages into conversation messages and vice versa, thereby facilitating conversations between users of devices configured to send/receive phone-based messages and users of devices configured to send/receive conversation messages. Portions of the process 300 will be described with reference to the diagram of illustrative data flows and interactions shown in FIG. 4, and the diagram of illustrative user interfaces shown in FIG. 5.

The process 300 shown in FIG. 3 begins at block 302. The process 300 may begin in response to an event, such as when the communication management system 100 begins, automatically or upon instruction, to receive phone-based messages 100 on behalf of an entity, such as the entity described above with respect to FIG. 2. When the process 300 is initiated, a set of executable program instructions stored on one or more non-transitory computer-readable media (e.g., hard drive, flash memory, removable media, etc.) may be loaded into memory (e.g., random access memory or "RAM") of a computing device of the communication management system 100. The executable instructions may then be executed by a hardware-based computer processor (e.g., a central processing unit or "CPU") of the computing device. In some embodiments, the process 300 or portions thereof may be implemented on multiple processors, serially or in parallel.

Figure 4:
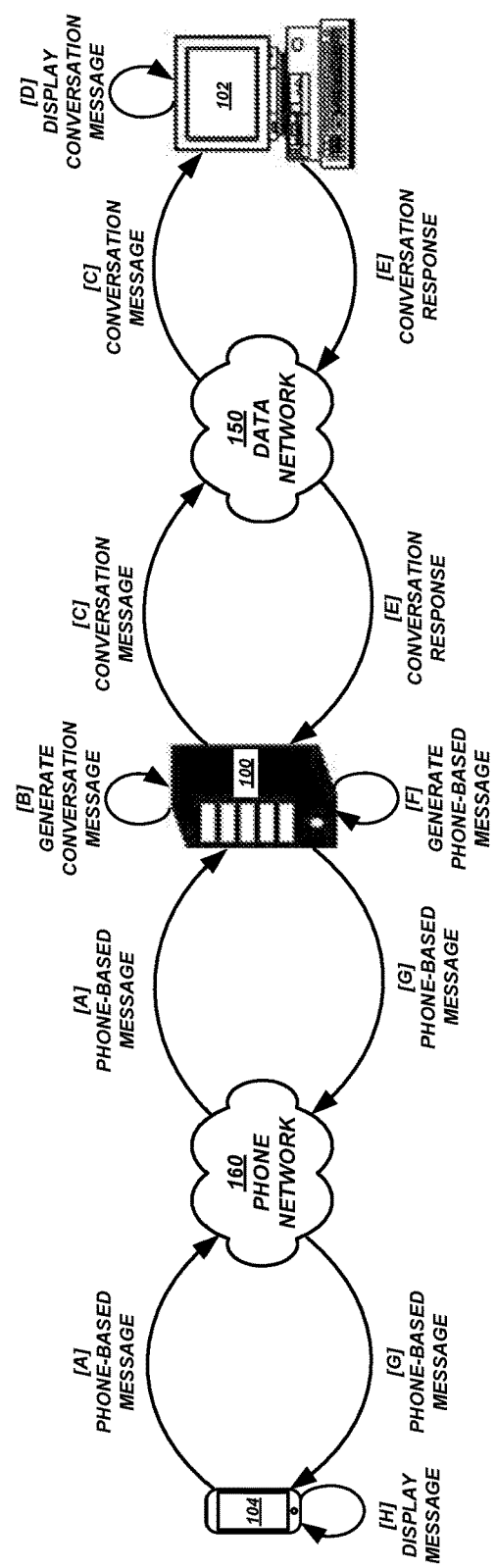
FIG. 4 is a block diagram of various data flows and interactions between the communication management system, various end user devices, and various networks during exchange of messages, according to some embodiments.

At block 304, the phone interface 116 or some other component or device of the communication management system 100 can receive a phone-based message. The phone-based message may be a text message (e.g., an SMS message) addressed to a phone number that has been assigned to the communication management system 100, but which may otherwise be associated with another entity as described above. The phone network interface 116 may receive the phone-based message. FIG. 4 shows an example of the receipt of such a message by the communication management system 100. In some embodiments, as shown, a user device 104 may transmit such as message to the communication management system 100 via a phone network 160 at [A]. Illustratively, the phone number of the user device 104 may be 555-555-5551, the phone number of the intended recipient may be 555-555-5552, and the contents of the message may be "I would like information about your products." In this example, the phone number of the originating user device 104 (555-555-5551) also serves as a return address for a reply to the message. The phone number of the intended recipient (555-555-5552) is the phone number associated with the phone account for which the communication management system 100 has been configured to serve as an intermediary. In this example, the contents of the message may be sent and received according to a standard (e.g., plain text data) specified by a phone service or other provider of SMS services. For example, the contents may be sent/received as plain text data using the GSM 03.38 7-bit alphabet, the ASCII standard, etc. In some embodiments, the contents may include or be sent/received as other data, such as images, video, sound, encrypted data, otherwise encoded information, etc.

At block 306, the conversation manager 120 or some other component or device of the communication management system 100 can determine the conversation of which the phone message is a part, or of which is it to be a part. In some embodiments, the communication management system 100 may be configured to add messages, addressed to the phone number of the intended recipient, into a particular chat room or other conversation space accessible by devices either associated with the phone number or otherwise associated with the entity using the services of the communication management system 100. When a message is received, the conversation manager 120 can use data in the accounts data store 110 and/or conversations data store 112 to identify the particular device and/or system to which the message should be transmitted. For example, the conversation manager 120 can query the accounts data store 110 using the phone number to which the phone message was addressed. In this example, the phone number of the intended recipient (555-555-5552) may be associated with a particular chat room of a particular collaboration system. The conversation manager 120 may obtain information for sending the phone message to the particular chat room (e.g., login credentials, IP address, message formatting or transformation data, communication protocol, etc.).

At block 308, the conversation manager 120 or some other component or device of the communication management system 100 can generate a conversation message for addition to the conversation identified above. In the illustrative data flows and interactions illustrated in FIG. 4, this operation is shown at [B].

In some embodiments, the conversation manager 120 can use transformation data regarding the particular message format and/or communication protocol to be used, such as transformation data obtained from the accounts data store 110. For example, individual collaboration systems may provide different features that may be accessible to the communication management system 100, or may otherwise have different requirements for messages that are sent to and/or received from the collaboration systems. The requirements may be implemented by the conversation manager 120 as a set of rules (e.g., conditional formatting or other processing operations) to be used when generating conversation messages targeted at particular collaboration systems. Illustratively, a collaboration system may be capable of displaying messages using formatted text data, such as the structured formatting provided by the Hypertext Markup Language ("HTML") standard. Structured formatting may allow the use of different fonts, effects (e.g., bold, italics), colors, styles, inclusion of predetermined and/or dynamically determined images (e.g., company logos), and the like. The conversation manager 120 can apply formatting to the text from the phone message according to rules specified in transformation data associated with the collaboration system that is the target of the message. The rules may suggest or require the application of certain formatting or other transformations to certain portions of the conversation message. For example, certain words or phrases may be associated with content such as web pages, other messages, or the like. Those words or phrases may be converted to—or otherwise displayed as—hyperlinks to the associated content. As another example, certain words or phrases may be associated with content such as images or animations. Those words or phrases may be display in connection with, or replaced by, the associated content. As yet another example, a phone message may include or reference non-textual content, such as an image, video, or audio file. The rules associated with the collaboration system that is the target of the message may specify how the non-textual content is to be included a conversation message (e.g., presented in-line with text, presented as a separate message, etc.), referenced by the conversation message (e.g., accessible via a hyperlink or other user-accessible option), blocked from being included in the conversation message, etc. As a further example, the conversation manager 120 can automatically add symbols to conversation messages to complement or replace particular words, phrases, or sentiments in a phone-based message. Illustratively, the conversation manager 120 can add emoticons or other pictorial representations of facial expressions to conversation messages, and/or remove symbols that are not supported—or substitute characters that are supported—by the message destination (e.g., user device 102) or messaging protocol (e.g., SMS).

In some embodiments, when the conversation manager 120 generates a conversation message according to the transformation data associated with a particular collaboration system, the conversation manager 120 can generate a file or data stream formatted according to the requirements of the collaboration system. For example, the conversation manager 120 may generate an HTML file, Extensible Markup Language ("XML") file, or a JavaScript Object Notation ("JSON") file. In some embodiments, the conversation manager 120 may use an application programming interface ("API") provided by, or otherwise configured to interface with, the collaboration system. The conversation manager 120 may generate message information formatted according the transformation data specific to the collaboration system. The conversation manager 120 may then make a programmatic call or other transmission in which the formatted message information is provided to the collaboration system.

In one specific non-limiting example, the transformation data may indicate that a conversation message is to have certain headers and/or metadata, certain content, and the like. In the present example, the text "I would like information about your products" may be tagged as "content." The conversation message may also be tagged with information indicating the chat room or recipients of the message (e.g., specific users or user devices). In addition, the message may be tagged with sender information indicating the sender of the message. In the present example, the sender may be indicated simply by using the phone number associated with the sending user device 104. In some embodiments, additional or alternative information may be used. For example, a token may be prepended or appended to the phone number so that recipients of the conversation message know that the message was received from a phone, or so that replies can be properly routed back to the original sender. Illustratively, the token may be a set of characters such as "sms@" to be prepended to the sending phone's phone number (e.g., "sms@5555555551"). In this way, replies may be properly routed back to the same number by parsing the phone number from the identifying information.

At block 310, the data network interface 118 or some other component or device of the communication management system 100 can transmit the conversation message to the appropriate devices or system. In some embodiments, as shown in FIG. 4, the conversation message may be transmitted at [C] to a user device 102 via the data network 150. In some embodiments, the conversation message may be transmitted to a collaboration system server or other computing device that manages a chat room. The collaboration system can then distribute the message to the specific user devices 102 that are participating in the chat, or make the conversation message available to user devices 102 that access the chat. In the present example, the entity that is using the communication management system 100 to serve as an intermediary for phone messages may have a particular chat room into which phone messages are to be delivered. The room maybe monitored by users of user devices 102. Individual user devices 102 may then receive or otherwise access the conversation message generated from the phone message, and display the conversation message as shown in FIG. 4 at [D].

Figure 5:
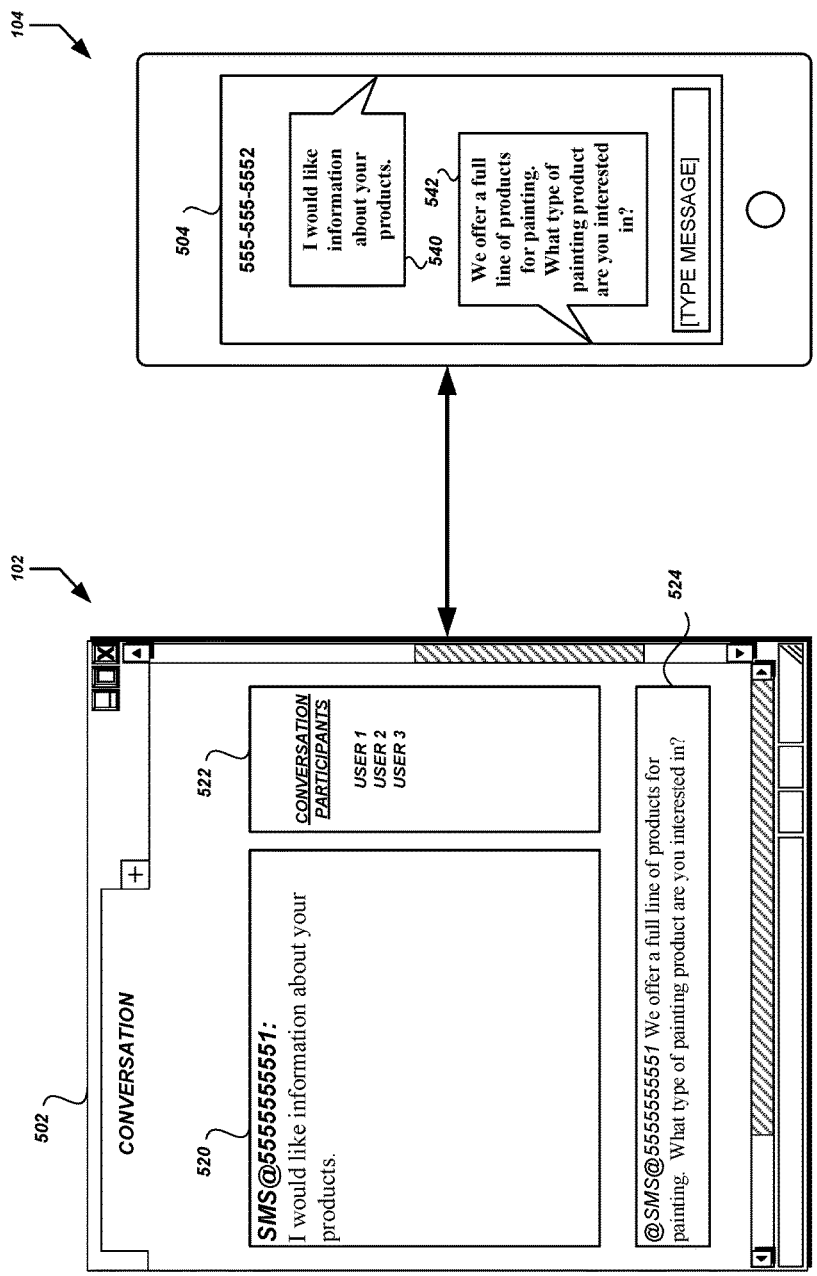
FIG. 5 is a user interface diagram of an illustrative interface displaying messages according to some embodiments.

Turning briefly to FIG. 5, an example user interface 502 of a user device 102 is shown. The user interface 502 shows a conversation message 520 that originated as a phone message 540 sent from the user device 104. As shown, the conversation message has been tagged as originating from the particular phone number of the user device 104. In addition, the conversation message appears in a chat room with multiple users, indicated by the chat participants 522 of the user interface 502. Additional aspects of FIG. 5 are described below with reference to other portions of the process 300.

Returning to FIG. 3, at decision block 312 the data network interface 118 or some other component or device of the communication management system 100 can determine whether a response to the conversation message has been received. If a response has been received, as shown in FIG. 4 at [E], the process 300 can proceed to decision block 314. Otherwise, the process 300 may terminate at block 322. In some embodiments, multiple phone-based messages may be received for a single conversation, from a single user device 102 or multiple different user devices 102, before a response is generated by a user device 104 (or without any response whatsoever). In some embodiments, the response to the conversation message is received from the collaboration system managing or otherwise associated with the conversation, rather than directly from the user device 102. For example, the user device 102 may generate a response to the conversation message, and the response may be received by the collaboration system. The collaboration system may then transmit or otherwise make available the response to the devices associated with other user accounts currently participating in the conversation, including the communication management system 100.

FIG. 5 illustrates the generation and transmission of a conversation response 524 to the conversation message 520. As shown, the conversation response 524 may include content, such as "We offer a full line of products for painting. What type of painting product are you interested in?" The conversation response may also include or otherwise be tagged with recipient information indicating an intended recipient of the response, which in this example is the sender of the original phone message 520. In some embodiments, the recipient information indicating an intended recipient of the conversation response 524 is the phone number of the user device 104, prepended with a token. This information may be embedded into the content of the response as shown (e.g., "@sms@5555555551 We offer a full line of products for painting . . . "), or it may be included separately (e.g., in a header or other associated metadata). The conversation response 524 can be transmitted to the communication management system 100 directly (e.g., from the user device 102 to the communication management system 100 via the data network 150), or indirectly (e.g., from the user device 102 to a collaboration system server or other device and then to the communication management system 100 via the data network 150).

Returning to FIG. 3, at decision block 314 the conversation manager 120 or some other component or device of the communication management system 100 can determine whether the response is part of the existing conversation, or whether a new conversation has begun. In some embodiments, a user of a user device 102 may wish to respond to the original conversation message in a manner that does not continue to add messages to the current conversation. For example, the user may wish to begin a private or semi-private chat with the user device 104, and without the other users listed in the chat participants 522. If present conversation response is to be treated as beginning a new conversation, then the process 300 can proceed to block 316. Otherwise, the process 300 can proceed to block 318.

At block 316, the conversation manager 120 or some other component or device of the communication management system 100 can in some embodiments generate new conversation data for use in managing the a conversation that has begun with the conversation response received above. For example, the conversation manager 120 can associate the phone number of the original sender of the phone message (e.g., the user device 104) with the new conversation. In this way, when the conversation manager 120 receives a subsequent phone-based message from the user device 104 and determines the conversation to which the subsequent phone-based message belongs at block 306, the new conversation can be identified instead of a "default" conversation or chat room associated with the phone number to which the phone message is sent. In some embodiments or for some conversations, the conversation manager 120 may not generate or maintain conversation data for use in managing a conversation. Instead, the use of phone numbers or other contact information in the messages and replies will suffice to ensure that the messages are formatted appropriately and sent to the proper recipient(s).

At block 318, the conversation manager 120 or some other component or device of the communication management system 100 can generate a phone-based message using the conversation response received above, as shown in FIG. 4 at [F]. In some embodiments, the conversation manager 120 can use transformation data regarding the message format and/or communication protocol of the original phone-based message received above. For example, the phone-based message may have been an SMS message. The conversation manger 120 may then use a set of rules or other transformation data to generate an SMS message.

The transformation data may be specific to the collaboration system from which the conversation response was received. As described above, the collaboration system may provide formatting and other features not available to phone-based messages. The transformation data for that collaboration system—or for the particular SMS service associated with the phone number of the user device 104, or for SMS services in general—may specify the particular format that the SMS message is to take, and/or the processing operations to be performed. Such formatting and processing may include converting formatted text into plain text (e.g., examining HTML tags and extracting textual content to be sent as plain text), stripping out or converting associated content into the content accessible by the user devise 104 (e.g., setting up images or videos as MMS messages separate from the textual content), removing hyperlinks or providing them separately (e.g., including a referenced URL in the message or in a separate message), etc. In the present example, the conversation manager 120 may generate an SMS message with the content "We offer a full line of products for painting. What type of painting product are you interested in?" The conversation manager 120 can address the SMS message to the phone number of the user device 104. In some embodiments, the conversation manager 120 may parse the phone number from the conversation response contents or metadata, depending upon the format of the incoming conversation response.

At block 320, the conversation manager 120 or some other component or device of the communication management system 100 can transmit the phone-based message to the user device 104, as shown in FIG. 4 at [G], for display at the user device 104, as shown in FIG. 4 at [H]. FIG. 5 illustrates display of the conversation response 542 in the user interface 504 of the user device 104.

The process 300 or portions thereof may be repeated or executed in parallel, as necessary. For example, when a new phone-based message is sent to the communication management system 100, whether from the user device 104 as part of the present conversation, as part of a new conversation, or from a different user device 104 altogether, the process 300 may proceed from block 304. In some embodiments, the same user device 104 may transmit different phone-based messages to different phone numbers as part of different conversations. Some or all of these phone-based messages may be received and handled by the same communication management system 100, and responses may be provided to the user device 104, without appearing to be sent to and/or received from the same communication management system 100 (e.g., the responses may appear as though they came from the different phone numbers even though each was transmitted from the same communication management system 100).

In some embodiments, a single conversation may include messages to and/or from multiple collaboration systems, and/or multiple different phone message users. For example, a user of a first user device 104 associated with a first phone number may send a phone message to three different phone numbers (e.g., transmitted as three different SMS messages). The three different phone numbers may include: a second phone number associated with a first collaboration system, a third phone number associated with a second collaboration system that is different (e.g., in branding, formatting requirements, communication protocols, etc.) than the first collaboration system, and a fourth phone number associated with a second user device 104. The communication management system 100 may receive the messages addressed to the second phone number and the third phone number on behalf of the two collaboration systems. The conversation manager 120 may transform the phone messages into two different conversation messages according to two different sets of transformation data, associated with the two different collaboration systems respectively. A response from a user device 102 associated with the first collaboration system may be received by the communication management system 100 for transformation and transmission to the other three conversation participants (or some subset thereof): the first and second user devices 104, and the second collaboration system. In order to ensure that the response is properly formatted for the second collaboration system, the conversation manager 120 may access a set of transformation data that specifies the rules for transforming a message from the first collaboration system into a message for the second collaboration system (e.g., rules specifying how different portions are to be formatted, how associated content is to be handled, etc.). Thus, the communication management system 100 may include not only transformation data for each collaboration system individually to allow conversations with user devices 104 that use phone messages, but also transformation data for each pair of collaboration systems (or some subset thereof) to allow conversations between each combination of collaboration systems (or some subset thereof).

In some embodiments, the communication management system 100 may apply transformations in addition to, or instead of, formatting-based and/or protocol-based transformations. For example, the communication management system 100 may translate the text from a first language to a second language (e.g., from English to Spanish) when generating a conversation message for a second user device 104 based on a phone-based message from a first user device 102. The language translation of messages may be performed using an automated translation component or system, such as a machine translation system that substitutes words from one language for corresponding words of another, or that decodes the meaning of a text in one language and encodes that meaning into text in a different language.

The language translation may be pre-configured based on profile settings associated with the various users, collaboration systems, or the like. For example, messages addressed to a particular collaboration system associated with a particular entity may always be translated into English if it is detected that the message is not in English. In some embodiments, the translation may occur automatically, such as based on an analysis of prior messages to and/or from the conversation participants. For example, if a particular conversation participant, such as a particular user of user device 102 or second user device 104, typically sends messages in Spanish, then the communication management system 100 may detect this and automatically translate future messages into Spanish. In embodiments where messages are distributed to multiple collaboration systems and/or multiple user devices 102, then a single message may be translated into translated messages in two or more different languages. Replies and additional conversation messages may be handled similarly.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising one or more computer processors programmed by executable instructions to at least:
   receive, via a phone network, a phone-based message, wherein the phone-based message is received from a first user device associated with a first phone number, wherein the phone-based message is addressed to a second phone number, and wherein the phone-based message comprises plain text data;
   select, based at least partly on the second phone number, a conversation of a plurality of conversations, wherein the conversation is managed by a collaboration system external to the system;
   generate a conversation message for the conversation using the phone-based message and first transformation data associated with the collaboration system, wherein the first transformation data indicates one or more transformations to use in generating formatted text data for the conversation message from plain text data;
   transmit, via a data network, the conversation message to the collaboration system;
   receive, via the data network, a conversation response from the collaboration system, wherein the conversation response is initiated by a second user device, and wherein the conversation response comprises formatted text data;
   determine, based at least partly on recipient information included in the conversation response, that a message is to be transmitted to the first user device;
   generate a phone-based response using the conversation response and second transformation data, wherein the second transformation data indicates one or more transformations to use in generating plain text data for the phone-based response from formatted text data; and
   transmit, via the phone network, the phone-based response to the first user device.

2. The system of claim 1, wherein the first transformation data comprises a set of rules for applying structured formatting to the plain text data from the phone-based message to generate the formatted text data for the conversation message.

3. The system of claim 1, wherein the one or more processors are further programmed by the executable instructions to at least:
   identify the recipient information in the conversation response based on at least one of a location of the recipient information or a tag associated with the recipient information; and
   determine, using the recipient information, a phone number of an intended recipient of the conversation response, wherein determining that a message is to be transmitted to the first phone number is based at least partly on the phone number of the intended recipient being the first phone number.

4. The system of claim 3, wherein the formatted text data from the conversation response comprises the recipient information, and wherein the recipient information comprises a prefix prepended to the first phone number.

5. The system of claim 1, wherein the phone-based message comprises a short message service ("SMS") message.

6. The system of claim 1, wherein the formatted text data for the conversation message comprises Hypertext Markup Language ("HTML") data.

7. A computer-implemented method comprising:
   as implemented by a computing system comprising one or more computer processors configured to execute specific instructions,
      receiving a first phone-based text message, wherein the first phone-based text message is received from a first computing device associated with a first phone number, and wherein the first phone-based text message is addressed to a second phone number;
      selecting, based at least partly on the second phone number, a conversation in which to add a first conversation message;
      generating formatted text data for the first conversation message using plain text data from the first phone-based text message;
      adding the first conversation message to the conversation;
      obtaining a second conversation message associated with the conversation;
      determining, based at least partly on recipient data in the second conversation message, that a message is to be sent to the first computing device;
      generating plain text data for a second phone-based text message using formatted text data from the second conversation message; and
      sending the second phone-based text message to the first computing device.

8. The computer-implemented method of claim 7, wherein adding the first conversation message to the conversation comprises sending the first conversation message to a collaboration system associated with the second phone number.

9. The computer-implemented method of claim 7, wherein generating the formatted text data for the first conversation message comprises applying a transformation, associated with the second phone number, to generate formatted text data from plain text data.

10. The computer-implemented method of claim 7, wherein generating the second phone-based text message comprises applying a transformation, associated with the second phone number, to generate plain text data from formatted text data.

11. The computer-implemented method of claim 7, wherein determining that a message is to be transmitted to the first computing device comprises:
   identifying the recipient data in the second conversation message; and
   parsing the recipient data to identify the first phone number, wherein the recipient data comprises the first phone number and a tag indicating an intended recipient.

12. The computer-implemented method of claim 7, further comprising:
   determining that the second conversation message is associated with a new conversation;
   storing conversation data indicating that a subsequent phone-based text message addressed from the first phone number and to the second phone number is to be used to add a message to the new conversation instead of the conversation;
   receiving the subsequent phone-based text message; and adding a third conversation message to the new conversation based at least partly on the subsequent phone-based text message and the conversation data.

13. The computer-implemented method of claim 7, further comprising registering, with a phone network, the second phone number as being associated with the computing system.

14. A system comprising:
computer readable memory storing executable instructions; and
one or more computing devices in communication with the computer readable memory and programmed by the executable instructions to at least:
receive a first text message comprising first plain text data, wherein the first text message is received from a first computing device associated with a first phone number, and wherein the first text message is addressed to a second phone number;
obtain a first set of rules regarding transforming plain text data to formatted text data, wherein the first set of rules is associated with the second phone number;
generate a first conversation message comprising first formatted text data using the first set of rules and the first plain text data;
send the first conversation message to a second computing device associated with the second phone number;
receive a second conversation message comprising second formatted text data;
obtain a second set of rules regarding transforming formatted text data to plain text data;
generate a second text message comprising second plain text data using the second set of rules and the second formatted text data; and
send the second text message to the first computing device.

15. The system of claim 14, wherein the first computing device comprises a mobile computing device, and wherein the second computing device comprises a collaboration system server device.

16. The system of claim 14, wherein the first set of rules comprises a rule specifying a structured formatting feature to be applied to plain text data.

17. The system of claim 14, wherein the first set of rules comprises a rule specifying that the first phone number is to be included in the first formatted text data and tagged as indicating a message source.

18. The system of claim 14, wherein the second set of rules comprises a rule specifying that plain text data is to be parsed from structured formatting features of formatted text data.

19. The system of claim 14, wherein the one or more computing devices are further programmed by the executable instructions to:
obtain a third set of rules regarding transforming formatted text data to other formatted text data, wherein the third set of rules is associated with a third phone number;
generate a third conversation message comprising third formatted text data using the third set of rules and the second formatted text data; and
send the third conversation message to a third computing device associated with the third phone number.

20. The system of claim 14, wherein the system is associated with a plurality of different phone numbers, and wherein individual phone numbers of the plurality of different phone numbers are associated with individual collaboration systems of a plurality of different collaboration systems.

* * * * *